United States Patent Office 3,347,836
Patented Oct. 17, 1967

3,347,836
THERMOSETTING METHYLOLATED
ACRYLIC POLYMER
Nobuyoshi Nagata, Hirakata-shi, Japan, assignor to Nippon Paint Co., Ltd., Osaka, Japan, a corporation of Japan
No Drawing. Filed Aug. 20, 1963, Ser. No. 303,406
Claims priority, application Japan, Aug. 22, 1962, 37/36,369
8 Claims. (Cl. 260—80.73)

This invention relates to a novel thermosetting resin. More particularly it relates to a novel thermosetting resin obtained by co-polymerization of allyl alcohol, with N-methylol acryl amide or N-methylol methacryl amide and at least one polymerizable monomeric compound such for example as acrylic ester, methacrylic ester, acrylonitrile, styrene, etc.

The reason for denominating the foregoing copolymer as a thermosetting polymer arises from the fact that said copolymer contains a hydroxy radical —OH, and a methylol radical —CH$_2$OH, and the reaction between these two polar radicals which occurs rapidly at a temperature of about 100° C., produces an ether bond. My invention is based on this newly found fact.

When a coating of this copolymer is heated to dryness at temperatures above 100° C., a coating providing greater hardness, improved pliability, and greater resistance to water and solvent is obtained when compared with a naturally dried coating. It is one of the characteristic features of this invention that the thermosetting of the resultant coating is effected by heating at a low temperature. Inasmuch as the coating of this polymer exhibits excellent resistance to light and weathering, widespread application will be realized for both indoor and outdoor coating.

The copolymer of this invention can be used by mixing with or dissolving in other synthetic resins and/or synthetic resin paints. If, for example, the copolymer is mixed wtih melamine resin paint, the mixture produces a coating with greatly enhanced resistance to light and weathering when compared to a melamine resin paint alone.

It is known in the synthetic resins art that if a butanol solution of a methylol compound such as methylol melamine is etherified under slightly acidic conditions, butyl-etherfied methylol melamine is obtained. In the light of this fact, we have found a method for producing a resin containing a hydroxy radical —OH and a methylol radical —CH$_2$OH; said hydroxy radical being derived from allyl alcohol. The methylol radical is derived from either N-methylolacrylamide, or N - methylolmethacrylamide, which may be present as starting materials, or may themselves be produced in situ by reacting acrylamide or methacrylamide with formaldehyde or a suitable alternative such as paraformaldehyde. During the process of copolymerization, the reaction temperature is maintained within the range of from 70° C. to 90° C. Such a temperature range has been found to prevent gelatination.

A more comprehensive understanding of the invention can be obtained by referring to the following illustrative examples which are not however, intended to unduly limit the scope of the invention.

*Experiment 1*

Into a 0.5 l. 4-necked distillation flask are introduced 78 parts by weight of allyl alcohol, (purity: 96 percent by volume). (All the allyl alcohol used in all examples are the same grade). 218 parts by weight of N-methylol acryl amide (purity: 60 percent aqueous solution; supplier; American Cyanamid Co.), 10 parts by weight of benzene, and 0.016 part by weight of hydroquinone. The temperature is raised to 75° C.–85° C., while stirring, and maintained there. Over a period of 6 hours, 79 parts by weight of distillate is obtained, the specific gravity of which is 0.987. The specific gravity of 0.987 corresponds to a mixture of about 90 percent by weight of water and about 10 percent by weight of allyl alcohol. Then the solution is dried under vacuum to remove volatile matter, and the infrared spectrograph of this material is found to correspond to that of authentic N-methylolacrylamide, which indicates that allyl alcohol and N-methylolacrylamide are not etherified and that the distillate produced during the reaction period is composed of water in the starting materials and a part of allyl alcohol.

*Experiment 2*

Into a 0.5 l. 4-necked distillation flask are introduced 121 parts by weight of allyl alcohol, 60 parts by weight of paraformaldehyde, 142 parts by weight of acrylamide, and 10 parts by weight of benzene. The temperature is raised while stirring, and at about 85° C. solid paraformaldehyde begins to dissolve, and refluxing starts at 95° C. Over a period of 4.5 hours, 36 parts by weight of distillate is obtained, the specific gravity of which is 0.987. The specific gravity of 0.987 corresponds to a mixture of about 90 percent by weight of water and 10 percent by weight of allyl alcohol. The reaction temperature after 4.5 hours of reflux is 112° C. Reaction products attained after 1.5 hours and 4.5 hours after start of reflux are quantitatively analyzed for free formaldehyde, methylol radical and hydroxy radical respectively. The results of these analyses are shown as follows.

| Item of measurement | Reaction time, hr. | | |
|---|---|---|---|
| | 0 (Theoretical value) | 1.5 | 4.5 |
| Free formaldehyde | 0.1580 | 0.0075 | 0.0043 |
| Free formaldehyde and methylol radical | 0.1580 | 0.0412 | 0.0116 |
| Methylol radical | 0 | 0.0337 | 0.0073 |
| Hydroxy radical | 0.1050 | 0.0316 | 0.0202 |

NOTE 1. The analytical data are expressed as number of grams versus 1 gram of sample.
NOTE 2. The theoretical values are obtained by calculation with regard to original solution.

The amount of distilled water produced by condensation during the reaction indicates that etherification of methylol radical and allyl alcohol has taken place. From the above analytical data, it is seen that at reaction temperatures close to 100° C., free formaldehyde, methylol radical and hydroxy radical all tend to decrease with increasing reaction time, and that etherification of allyl alcohol has proceeded about 65 percent after 1.5 hours and about 85 percent after 4.5 hours.

In a copolymerization process such as this, wherein a hydroxy radical and a methylol radical are both present, etherification occurs at temperatures higher than about 100° C., at which temperatures cross-linking of high molecules, formation of three dimensional structures and gelatination of resin are induced. To avoid these undesirable effects in the manufacture of resins, it is preferred to conduct the reaction at temperatures below 100° C., more preferably between 70°–90° C. When reaction time is short or the concentration of copolymer in solution is low, it is practicable to employ temperatures higher than 90° C.

EXAMPLE 1

Into a 1 l. 4-necked distillation flask are placed 32 parts by weight of acrylamide, 26 parts by weight of allyl alcohol, 75 parts by weight of methyl methacrylate, 135 parts by weight of ethyl acrylate, 160 parts by weight of dioxane and 0.8 part by weight of dodecyl mercaptan.

While stirring the temperature is raised and when refluxing starts at 98° C., 27 parts by weight of 10 percent dioxane solution of benzoyl peroxide is added over a period of 50 minutes. The polymerization reaction is continued for an additional 3 hours after addition of the benzoyl peroxide. The resulting resin is a viscous light-yellow liquid, and it represents a conversion of 93 percent. The rate of conversion of allyl alcohol is 45 percent, when based on the concentration of hydroxy radical in the copolymer versus the theoretical concentration of hydroxy radical in the charge. The percentage by weight of allyl alcohol participated in co-polymerization reaction versus co-polymer is 4.8 percent.

The unreacted allyl alcohol is removed by distilling azeotropically with three portions of 90 parts by weight of toluene. After cooling the reaction mixture to room temperature, 42 parts by weight of a solution composed of 40 percent by weight of formaldehyde and 60 percent by weight of butanol are added thereto. It is heated slowly while stirring to 70° C. and condensation proceeds at this temperature for 2 hours The resultant resin is heated to dry at a temperature higher than 100° C. for 30 minutes in a thin film. A film having improved hardness, toughness, smoothness and luster is thereby obtained.

EXAMPLE 2

60 parts of the resin obtained in Example 1, 20 parts of titanium dioxide and 20 parts of xylol all by weight ratio are kneaded into an enamel. This enamel is coated on sheet steel panels and subjected to heating at 140° C. for 30 minutes to effect condensation. The resulting films have excellent impact resistance and great hardness.

EXAMPLE 3

45 parts by weight of a typical commercially available melamine resin paint (e.g. Orga 100; supplier Nippon Paint Co., Ltd.) and 45 parts by weight of enamel obtained according to Example 2 are mixed with 10 parts by weight of butanol and dissolved therein. Thin film of coating are made from this solution and heated at 130° C. for 30 minutes. Resistance to light and weathering are improved in this resin.

EXAMPLE 4

A 2 l. 4-necked distillation flask is charged with 48 parts by weight of allyl alcohol, 57 parts by weight of acrylamide, 128 parts by weight of methyl methacrylate, 100 parts by weight of ethyl acrylate and 110 parts by weight of 2-ethyl hexyl acrylate. Stirring and heating are commenced and 440 parts by weight of dioxane, and 1.6 parts of dodecyl mercaptan are added. The temperature of the mixture is raised to 103° C. within 30 minutes and refluxing begins. Immediately upon commencement of reflux 45 parts by weight of a 10 percent dioxane solution of benzoyl peroxide are added over a period of one hour. Stirring and refluxing are continued for an additional 4 hours, and at the conclusion of the reaction period a light yellow transparent, viscous resin solution is obtained.

Dioxane is removed by blowing a stream of nitrogen across the surface of the solution. After 100 parts by weight of the solvent are removed, the remaining dioxane and unreacted allyl alcohol are azeotropically distilled off with two or three portions of 100 parts by weight of toluene, after which the resin solution is free of allyl alcohol. While maintaining the temperature of the resin solution at 60° C. or less, 120 parts by weight of a solution of 40 percent (by weight) of formaldehyde, 60 percent (by weight) of butanol and 1.8 parts by weight of maleic anhydride are added thereto. While stirring, the temperature of the solution is raised to 80° C., and maintained thereat for 1 hour. The resultant resin solution amounts to 1006 parts by weight, of which 42 percent is volatile matter. The viscosity of the solution is 21 poises, which corresponds to 90 percent conversion. The resin solution finally obtained is diluted with toluol sufficient to make its viscosity suitable for coating on the surface of sheet steel panels. The films after curing at 140° C., for 30 minutes, possess superior resistance to impulse, water, light and weathering.

Brit. Pat. 467,492 (June 11, 1937, Rohm and Haas Co. Condensation products of methacrylamide and formaldehyde) teaches that methacrylamide and copolymerized methacrylamide react with formaldehyde to form methylol compounds. It further teaches that methacrylamide copolymer is prepared by solvent copolymerization and recites the use of such solvents as ethyl alcohol, propyl alcohol, butanol and the like as a polymerizing solvent. According to my present invention, as shown in Examples 1 and 4, the use of dioxane improves the rate of copolymerization of allyl alcohol, and in addition provides for a convenient method of monitoring said rate by permitting quantitative analysis for hydroxy radical unhampered by the presence of hydroxyl from alcoholic solvents. While it is preferred to use dioxane, acetonitrile or ethyl alcohol are also useful as polymerizing solvents. Other solvents such as aromatic hydrocarbons and esters of acetic acid may be used in combination with the principal solvents. Polymerization or copolymerization of compounds containing allyl radicals has previously been difficult to effect. It has been even more difficult to effect an increase in the rate of conversion to a practical value by adding small amounts of allyl alcohol. This invention may be characterized in part by the fact that the use of solvent polymerization as described herein results in an increase of more than 40 percent in the rate of conversion when measured against the amount of allyl alcohol added. No examples of such marked improvement in the rate of conversion have been found in the prior art.

The irritating odor caused by even small amounts of unreacted allyl alcohol remaining in the resulting resin cause problems in handling the resin. Accordingly, this invention provides a simple and effective method of removing said allyl alcohol by azeotropically distilling it off with toluene, propyl alcohol, or propyl acetate. As an alternative the allyl alcohol may be removed by distillation under reduced pressure.

In addition to allyl alcohol and acrylamide or methacrylamide, one or more of the monomers selected from the group consisting of acrylic esters, methacrylic esters, acrylonitrile, α,β-ethylenically unsaturated acids, styrene, vinyl toluene and vinylacetate are added to the reaction mixture. N-methylolacrylamide can be substituted for acrylamide, and N-methylolmethacrylamide for methacrylamide. When these substitutes are employed, hydroxy methylation of acrylamide and methacrylamide with formaldehyde may be omitted.

Polymerization is preferably conducted in dioxane as herein described, but it may likewise be conducted using an excess of allyl alcohol or in addition to allyl alcohol, methallyl alcohol, allyl chloride, or methallyl chloride. When allylic solvents such as these are used, they serve as both a source of allylic monomer and as a solvent. It is known that polymers of allyl chloride or methallyl chloride may be saponified by alkalis such as caustic soda to produce resin having alcoholic hydroxyl groups.

If necessary, small amounts of polymerization controllers such as mercaptans can be added or small amounts of organic or inorganic acids can be used for the alkyletherification of methylol radicals in accordance with known methods. The alcohol to be used for alkyletherification, may be one or more than one of ethyl alcohol, propyl alcohol, butyl alcohol or allyl alcohol.

The copolymer of this invention is characterized by having the following composition: 0.5–20 percent by weight of allyl alcohol, 1–30 percent by weight of N-methylol acrylamide or N-methylol methacrylamide and 50–98.5 percent by weight of other polymerizable monomeric component.

The copolymer may be further characterized in that the segment thereof represented by the formula:

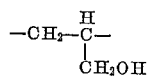

comprises from 0.5–20 parts by weight and the additional segment thereof represented by the formula:

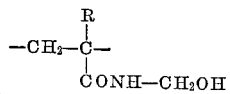

wherein R is selected from the group consisting of hydrogen and methyl, comprises from 1–30 parts by weight of the total weight of the copolymer.

My invention is not restricted to the illustrative examples nor to the use of the resin product.

The resin of this invention has widespread use in the coatings field. It is also used together with other resin such as urea resin, melamine resin, melamine resin paint, alkyd resin paint, epoxy resin paint, nitrocellulose and resin paint or the like so long as they are compatible with the resin of this invention.

What is claimed is:

1. A process for producing a thermosetting copolymer comprising copolymerizing at a temperature of about 100° C. 0.5 to 20% by weight of allyl alcohol in solution with 1 to 30% by weight of N-methylol acrylamide or N-methylolmethacrylamide and with 50 to 98.5% by weight of at least one polymerizable monomeric compound selected from the group consisting of acrylic esters, methacrylic esters, acrylonitrile, α-β-ethylenically unsaturated carboxylic acids, styrene, vinyl toluene and vinyl acetate.

2. A process as claimed in claim 1 wherein dioxane is used as a solvent for the copolymerization.

3. A process for producing a thermosetting copolymer comprising copolymerizing 0.5 to 20% by weight of allyl alcohol in solution with 1 to 30% by weight of acrylamide or methacrylamide with 50 to 98.5% by weight of at least one polymerizable compound selected from the group consisting af acrylic esters, methacrylic esters, acrylonitrile, α,β-ethylenically unsaturated carboxylic acids, styrene, vinyl toluene, and vinyl acetate and then hydroxymethylating the obtained copolymer at a temperature of about 100° C.

4. A process as claimed in claim 3 wherein hydroxymethylating is effected with formaldehyde or paraformaldehyde.

5. A process as claimed in claim 3 wherein dioxane is used as a solvent for the copolymerization.

6. A thermosetting copolymeric resin consisting essentially of from 0.5 to 20% by weight of allyl alcohol, from 1 to 30% by weight of at least one compound selected from the group consisting of N-methylolacrylamide and N-methylolmethacrylamide and from 50 to 98.5% by weight of at least one polymerizable monomeric compound selected from the group consisting of acrylic esters, methacrylic esters, acrylonitrile, α,β-ethylenically unsaturated carboxylic acids, styrene, vinyl toluene, and vinyl acetate.

7. A process as claimed in claim 1, wherein the solvent for the copolymerization reaction is selected from the group consisting of allyl alcohol, methallyl alcohol, allyl chloride, and methallyl choride, and when said solvent is allyl alcohol, it is introduced as an excess of reactant.

8. A process as claimed in claim 3, wherein the solvent for the copolymerization reaction is selected from the group consisting of allyl alcohol, methallyl alcohol, allyl chloride, and methylallyl chloride, and when said solvent is allyl alcohol, it is introduced as an excess of reactant.

References Cited
UNITED STATES PATENTS

| | | | |
|---|---|---|---|
| 2,680,110 | 6/1954 | Loughran et al. | 260—86.1 |
| 3,037,963 | 6/1962 | Christenson | 260—72 |
| 3,118,852 | 1/1964 | Christenson et al. | 260—80.5 |
| 3,230,275 | 1/1966 | Sekmakas | 260—80.5 |

JOSEPH L. SCHOFER, *Primary Examiner.*

W. HOOVER, S. M. LEVIN, *Assistant Examiners.*